Jan. 6, 1953
C. A. STRAND
2,624,589
CONCEALABLE TRAILER HITCH
Filed Dec. 11, 1950
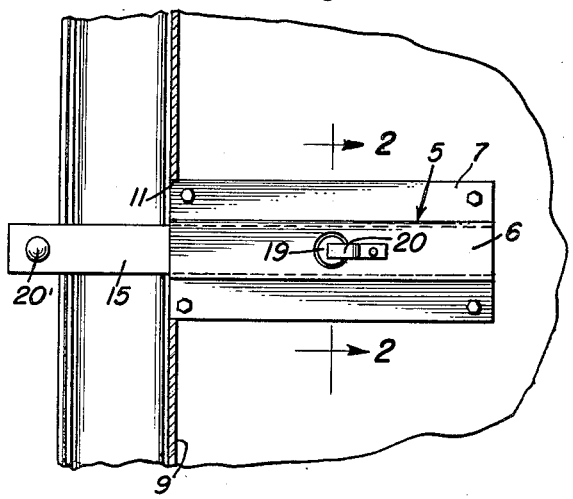
Fig. 1
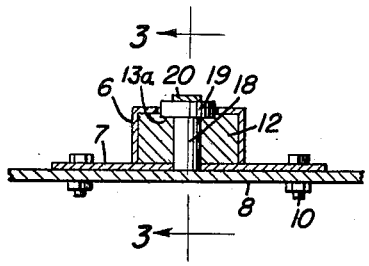
Fig. 2
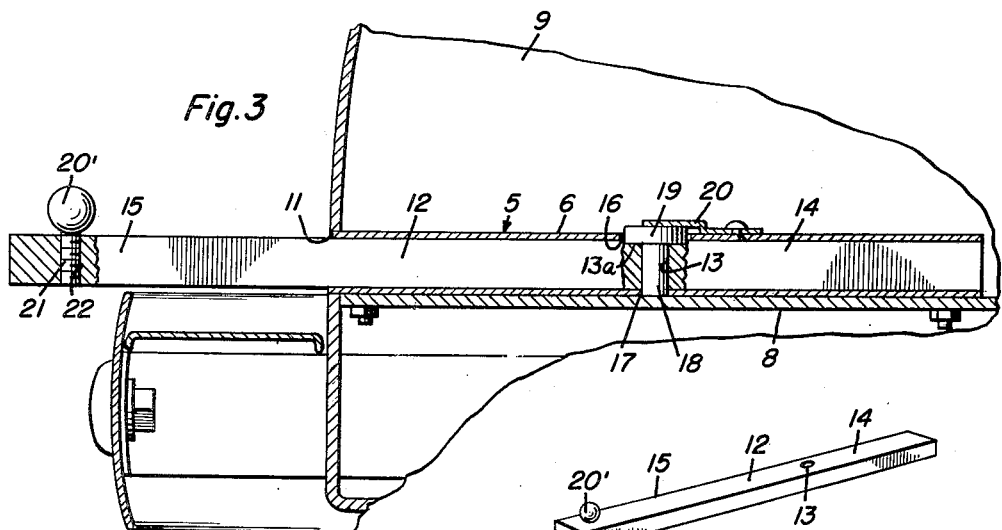
Fig. 3
Fig. 4
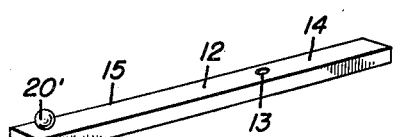
Fig. 5
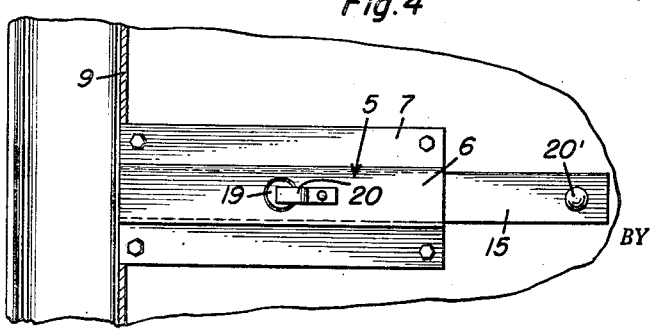
Charles A. Strand
INVENTOR.
BY *Clarence A. O'Brien
and Harvey B. Jackson*
Attorneys Patented Jan. 6, 1953

2,624,589

UNITED STATES PATENT OFFICE 2,624,589

CONCEALABLE TRAILER HITCH

Charles A. Strand, Duluth, Minn.

Application December 11, 1950, Serial No. 200,243

1 Claim. (Cl. 280—33.44)

The present invention relates to new and useful improvements in trailer hitches and more particularly to a hitch adapted for attaching inside the trunk of an automobile.

An important object of the invention is to provide a hitch which is concealed in the automobile trunk, when not in use.

Another object is to provide a device of this character of simple and practical construction, which is strong and durable, relatively inexpensive to manufacture and otherwise well adapted for the purposes for which the same is intended.

Other objects and advantages reside in the details of construction and operation as more fully hereinafter described and claimed, reference being had the the accompanying drawings forming part hereof, wherein like numerals refer to like parts throughout, and in which:

Figure 1 is a fragmentary sectional view of an automobile trunk showing a top plan view of the hitch therein;

Figure 2 is a transverse sectional view taken on a line 2—2 of Figure 1;

Figure 3 is a longitudinal sectional view taken on a line 3—3 of Figure 1;

Figure 4 is a view similar to Figure 1 and showing the hitch in concealed position in the trunk; and Figure 5 is a perspective view, on a reduced scale of the reversible hitch bar.

Referring now to the drawing in detail, wherein for the purpose of illustration I have disclosed a preferred embodiment of my invention, the numeral 5 designates a hitch attaching member and which comprises an elongated rectangular shaped housing 6 having flanges 7 at each side for attaching to the floor 8 of an automobile trunk 9 by means of bolts and nuts 10 or the like.

Each end of housing 6 is open and the rear end of the housing is alined with an opening 11 cut in the rear of the trunk.

A hitch bar 12 is adapted for placing in either end of housing 6 by sliding the bar therein and a vertical opening 13 is formed in the bar nearer one end thereof to provide a short end 14 and a long end 15. Opening 13 is adapted to aline with upper and lower openings 16 and 17 in housing 6 to receive a locking pin 18 having a head 19 recessed in the top opening 16 and which is relatively larger to accommodate the head. The upper end of opening 13 is provided with a counter-sink 13a in registry with opening 16 and the head 19 of pin 18 is positioned in the counter-sink so that shearing stress will be applied to the head of the pin rather than to the shank thereof. A leaf spring 20 is fixed at one end to the top of the housing 6 with its free end overlying head 19 to hold the locking pin in position.

The longer end 15 of bar 12 projects rearwardly through opening 13 in trunk 9 and a ball 20' having a stem 21 is threaded in an opening 22 in the outwardly projecting end of the bar and is adapted for attaching to a companion part on a trailer (not shown).

In the operation of the device, the locking pin 18 is easily removed by releasing spring 20 so that bar 12 may be inserted in either end of housing 6 and locked by the pin and with the longer end 15 of the bar projecting either rearwardly through opening 11 in the trunk or projecting forwardly at the front end of housing 6 into the trunk. With the bar projecting rearwardly, as shown in Figures 1 and 3 a trailer may be attached to ball 20 and when the bar is reversed, as shown in Figure 4, the longer end 15 of the bar with the ball 20' is enclosed in the trunk to conceal the hitch therein and the opening 11 in the trunk is closed by the short end 14 which is flush with the opening.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A trailer hitch comprising in combination, a vehicle trunk having an opening, an elongated housing open at each end, means securing the housing in the trunk with one end of the housing alined with the opening in the trunk, a bar having a hitch member at one end and reversibly received in either end of the housing to selectively position the hitch member either outwardly or inwardly of the trunk, and a headed locking pin passing through both the housing and the bar to lock the bar in either position in the housing, said housing including an upper wall having an opening in which the head of the pin is received and said bar having a counter-sink in registry with the opening in said upper wall and also receiving the head of the pin so that shearing stress will be applied to the head of the pin.

CHARLES A. STRAND.

REFERENCES CITED

The following references are of record in the file of this patent:

UNITED STATES PATENTS

| Number | Name | Date |
|---|---|---|
| 1,066,816 | Hess | July 8, 1913 |
| 2,425,838 | Schultz | Aug. 19, 1947 |